United States Patent

Waldmann et al.

Patent Number: 6,164,079
Date of Patent: Dec. 26, 2000

[54] CRYOGENIC TREATMENT OF SILICON NITRIDE TOOL AND MACHINE PARTS

[76] Inventors: Christian Clark Waldmann, 31 Mound St., Milford; Fred J. Waldmann, 890 W. Loveland Ave. Apt. J-8, Loveland, both of Ohio 45140

[21] Appl. No.: 09/362,594

[22] Filed: Jul. 28, 1999

Related U.S. Application Data

[60] Provisional application No. 60/094,773, Jul. 31, 1998.

[51] Int. Cl.[7] ............................ F25D 25/00; F25D 13/04; C21D 6/04

[52] U.S. Cl. .................................... 62/62; 62/65; 148/577

[58] Field of Search ........................... 62/65, 62; 148/577

[56] References Cited

U.S. PATENT DOCUMENTS

| | | | |
|---|---|---|---|
| 5,259,200 | 11/1993 | Kamody | 62/64 |
| 5,695,830 | 12/1997 | Larnac et al. | 427/576 |
| 5,865,913 | 2/1999 | Paulin et al. | 148/577 |
| 6,056,857 | 5/2000 | Hunt et al. | 204/192.15 |

*Primary Examiner*—William Doerrler
*Attorney, Agent, or Firm*—Neal O. Willmann

[57] ABSTRACT

This disclosure describes a cryogenic process for increasing the life of silicon nitride tool materials such as machining inserts used in the high-speed machining of cast irons and other materials. The process entails placing the tools in a cryogenic chamber where the temperature is lowered to about −320° F. and held at that level for a period of time and then raised to ambient temperature. Both the lowering and raising of the temperature are at specifically controlled rates.

1 Claim, No Drawings

CRYOGENIC TREATMENT OF SILICON NITRIDE TOOL AND MACHINE PARTS

This applications claims benefit to provisional application 60/094,773 filed Jul. 31, 1998.

BACKGROUND OF THE INVENTION

This invention relates to a cryogenic process for treating silicon nitride materials that are used in machining, at high speeds and feeds, cast iron and other materials. The disclosed process increases the durability of the silicon nitride materials, thus increasing the wear-life by multiples of 2–3 times.

SUMMARY OF THE INVENTION

The process of the present invention relates specifically to a method for treating silicon nitride materials which comprises: holding a silicon nitride item to a sustained temperature of −20° F. to −50° F. for a period of time to effect temperature stabilization; applying gaseous nitrogen to said silicon nitride item to lower, at a rate no faster than 4° F. or slower than one-half of a degree F. per minute, its temperature to a temperature within the range of −300° F. to −320° F.; holding said temperature for a period of 1 to 24 hours, depending on the volume and mass of the material being treated; and increasing the temperature of the item to ambient temperature.

DESCRIPTION OF THE PREFERRED EMBODIMENTS

The present invention relates to a method or process for treating silicon nitride tools and materials with cryogenic temperatures for particular periods of time.

The equipment needed to perform the disclosed process includes a cryogenic chamber and nitrogen gas. In preferred embodiments of the disclosed process, the chamber is equipped with a sub-zero refrigeration compressor to provide stabilizing holding temperatures before and after processing with gaseous nitrogen.

The actual process begins by placing the silicon nitride materials in the chamber and stabilizing the temperature, with the refrigeration unit, in a range of −20° F. to −50° F. Once the stabilization temperature is reached and maintained, gaseous nitrogen at −320° F. is introduced to the chamber. In preferred embodiments of the disclosed process, the disclosed method of treatment is controlled by sensors monitored by computer or processor. The processor controls both the time and the temperature of the treatment cycle.

Critical to the disclosed process is the rate of temperature change. Depending on the type, mass and volume of the material being treated, the temperature is lowered as quickly as 4° per minute or as slow as one-half degree F. per minute, with gaseous nitrogen. Temperature parameters are established with a process controller and are a function of the skill and experience of the operator. It should be noted that no liquid nitrogen is allowed into the chamber. And, as alluded to above, the temperature is measured by a thermocouple or RTD for feedback to a computer or processor.

When a temperature of −220° F. to −240° F. is reached within the chamber, the temperature is held at that point for a brief period of time for temperature stabilization. It is then lowered at the same rate as before, to the maximum low temperature provided by the gaseous nitrogen. The silicon nitride tool material can be held at −300° F. to −320° F. for as long as desired, but minimally for one hour.

After holding the temperature in the −300° F. to −320° F. for the specified period of time, the temperature of the inner chamber and its contents is allowed to warm at a rare no slower than one-half degree F. per minute to the initial stabilization temperature of −50° F. to −20° F. After reaching this stabilization temperature, the material being treated is ready to be returned to ambient temperature.

Early reports from the testing of tools and materials treated according to the disclosed method show an increase in longevity and tool life of 200%–300% providing a substantial savings in silicon nitride tool costs.

Examples of silicon nitride materials that have been treated according to the disclosed process include tooling inserts of various shapes and sizes, impact surfaces of certain tools and instruments, such as golf clubs, have been treated to prevent shattering; and, silicon nitride balls for bearings have been treated for ultimate use in aircraft fuel pumps and are expected to offer longer life.

While the foregoing is a complete and detailed description of preferred embodiments of the disclosed process, numerous modifications and variations may also be employed to implement the all-important purpose of the invention without departing from the spirit of the invention; and, therefore, the elaboration provided should not be assumed to limit, in anyway, the scope of the invention which is fairly defined by the appended claim.

What is claimed is:

1. A process for treating silicon nitride materials which comprises: holding a silicon nitride metal item to a sustained temperature of −20° F. to −50° F. for a period of time to effect temperature stabilization; applying gaseous nitrogen to said silicon nitride metal item to lower, at a rate no slower than one-half degree F. per minute, its temperature to a temperature within the range of −300° F. to −320° F.; holding said temperature for a period of 1 to 24 hours, depending on the volume and mass of the material being treated; and increasing the temperature of the item to ambient temperature.

* * * * *